(12) United States Patent
Peart

(10) Patent No.: US 6,938,949 B1
(45) Date of Patent: Sep. 6, 2005

(54) OPEN-AIR PICKUP TRUCK

(75) Inventor: Randal Peart, Royal Oak, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/795,479

(22) Filed: Mar. 8, 2004

(51) Int. Cl.$^7$ .................................................. B60J 7/00
(52) U.S. Cl. ........................... 296/190.08; 296/107.08; 296/190.11; 296/216.02; 296/146.8
(58) Field of Search ....................... 296/190.08, 107.08, 296/107.17, 108, 146.14, 107.07, 76, 272, 296/223, 107.09, 107.18, 117, 147, 180.1, 296/203.03

(56) References Cited

U.S. PATENT DOCUMENTS

| | | | | |
|---|---|---|---|---|
| 3,357,738 | A * | 12/1967 | Bourlier | 296/108 |
| 3,823,977 | A * | 7/1974 | Fioravanti | 296/216.02 |
| 4,630,858 | A * | 12/1986 | Bez | 296/146.8 |
| 4,805,986 | A * | 2/1989 | Weissert | 428/542.8 |
| 5,033,789 | A * | 7/1991 | Hayashi et al. | 296/216.02 |
| 5,470,126 | A * | 11/1995 | Hines, Jr. | 296/223 |
| 5,584,522 | A * | 12/1996 | Kerner et al. | 296/108 |
| 6,033,012 | A * | 3/2000 | Russke et al. | 296/107.17 |
| 6,260,916 | B1 * | 7/2001 | Hunt | 296/190.11 |
| 6,419,308 | B1 * | 7/2002 | Corder et al. | 296/107.08 |
| 6,478,368 | B1 * | 11/2002 | de Gaillard | 296/216.02 |
| 6,481,772 | B1 * | 11/2002 | Tenn | 296/146.16 |
| 6,485,094 | B2 * | 11/2002 | Corder et al. | 296/216.02 |
| 6,513,863 | B1 * | 2/2003 | Renke et al. | 296/190.11 |
| 6,547,298 | B2 * | 4/2003 | Sotiroff et al. | 296/26.09 |
| 6,550,849 | B1 * | 4/2003 | Dosdall | 296/190.11 |
| 6,672,638 | B2 * | 1/2004 | Corder et al. | 296/37.16 |
| 6,702,361 | B2 * | 3/2004 | Russke | 296/107.08 |
| 6,702,363 | B2 * | 3/2004 | Tohda et al. | 296/107.17 |
| 6,783,172 | B2 * | 8/2004 | De Gaillard | 296/146.8 |
| 2003/0164622 | A1 * | 9/2003 | De Gaillard | 296/26.09 |
| 2005/0017545 | A1 * | 1/2005 | Rudolph et al. | 296/190.11 |
| 2005/0017548 | A1 * | 1/2005 | Rudolph et al. | 296/107.17 |

\* cited by examiner

*Primary Examiner*—Kiran B. Patel
(74) *Attorney, Agent, or Firm*—Laura C. Hargitt

(57) ABSTRACT

A vehicle body has a first body portion forming an enclosed passenger compartment that includes a roof having a panel opening and a rear window opening. A rear window is fixed in a frame that is hingedly attached to the first body portion. A rigid roof panel is hingedly attached to the frame, forming a roof assembly that is movable between a storage position and a closed position. The roof assembly closes the panel opening and the rear window opening in the closed position. A second body portion forms a storage compartment external to the passenger compartment and is open adjacent the rear window opening. The roof assembly is movable to the storage position in the storage compartment, exposing the passenger compartment to outside air through the panel opening and the rear window opening.

20 Claims, 3 Drawing Sheets

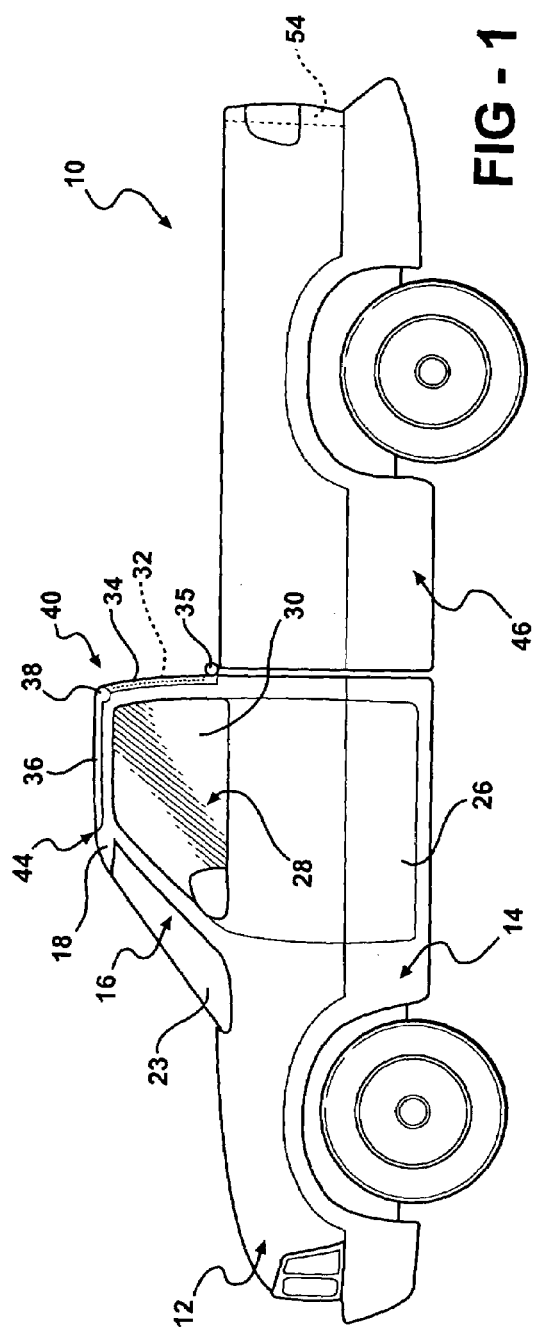
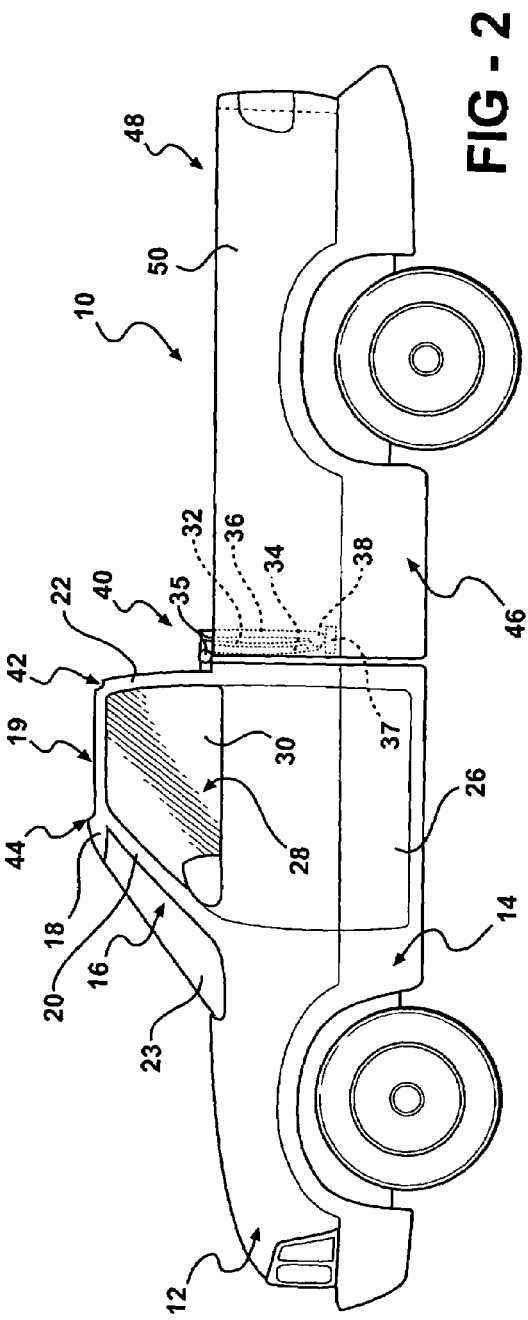

OPEN-AIR PICKUP TRUCK

BACKGROUND OF THE INVENTION

The present invention relates generally to vehicles having moveable roof panels and, in particular, to an apparatus for selectively exposing an interior of a pickup truck cab.

Open-air vehicles, such as convertibles and the like, are well known. A typical convertible has a two door body style with a folding roof, either flexible or rigid, that can be stored in a separate compartment or boot formed in the vehicle body between the passenger compartment and the trunk. When the roof is stored, the entire passenger compartment is exposed to the surrounding environment.

Also well known are vehicles having transparent or solid opaque roof panels that are removable and stored in the trunk or luggage area. Other vehicles are provided with transparent or solid roof panels that are manually or automatically movable to an open position to expose an opening in the vehicle roof. These later roof configurations are commonly known as moonroofs and sunroofs.

Pickup trucks have increased in popularity in recent years. Many pickup trucks are provided with moonroofs or sunroofs and/or have a sliding rear window. While many customers are satisfied with moonroofs and the like, there are customers who prefer the open air feel provided by convertible vehicles. Prior art convertible pickup trucks, however, typically have had structural shortcomings with high interior noise levels and a lack of security due to canvas roofs. In addition, a vehicle with a full convertible top loses much of its torsional stiffness imparted by the roof structure, disadvantageously giving a shaky ride and reduced durability. Folding tops also require storage room behind the seats that shortens the truck bed.

It is desirable, therefore, to provide a vehicle body, such as a pickup cab and pickup bed, having open air characteristics while not introducing unwanted performance characteristics such as shaky ride, poor security, reduced durability, and high interior noise levels.

SUMMARY OF THE INVENTION

The present invention concerns a vehicle body having a first body portion forming an enclosed passenger compartment includes a roof having a panel opening and a rear window opening. A rear window is fixed in a frame that is hingedly attached to the first body portion. A rigid roof panel is hingedly attached to the frame, forming a roof assembly that is movable between a storage position and a closed position. The roof assembly closes the panel opening and the rear window opening in the closed position. A second body portion forms a storage compartment external to the passenger compartment and is open adjacent the rear window opening. The roof assembly is movable to the storage position in the storage compartment, exposing the passenger compartment to outside air through the panel opening and the rear window opening.

The vehicle in accordance with the present invention advantageously provides opportunities for fundamental customization such as the open-air option. The vehicle in accordance with the present invention provides a unique open-air character to pickup trucks while maintaining the security and noise levels of a regular cab pickup truck. The vehicle in accordance with the present invention overcomes these disadvantages at much lower cost than a full convertible roof and opens the way to a new class of vehicles.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a side elevation view of a vehicle having a hinged top in accordance with the present invention shown in a closed position;

FIG. 2 is a side elevation view of view of the vehicle of FIG. 1 shown with the hinged top in an open position;

DESCRIPTION OF THE PREFERRED EMBODIMENT

Figure 3:
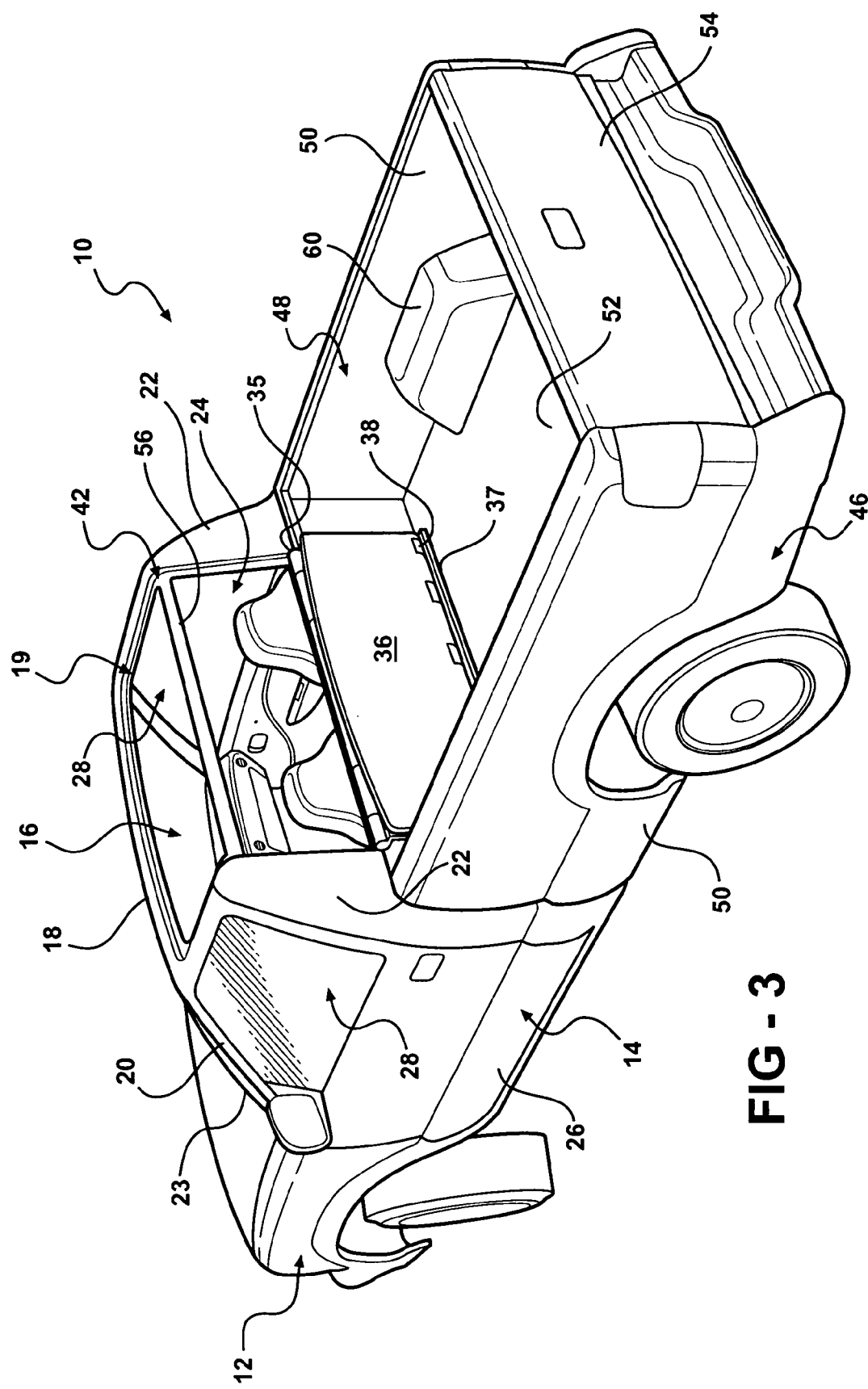
FIG. 3 is a top perspective view of the vehicle of FIG. 2.

Referring now to FIGS. 1–3, an open-air vehicle in accordance with the present invention is indicated generally at 10. The vehicle 10 includes a vehicle body 12 having a first body portion 14 that forms an enclosed passenger compartment, indicated generally at 16. The first body portion 14 is preferably a pickup truck cab or the like. The passenger compartment 16 is defined by a roof 18 that is connected to the first body portion 14 by a pair of front roof support pillars 20 and a pair of rear roof support pillars 22. The roof 18 includes a panel opening 19 formed therein, best seen in FIG. 3. The rear roof support pillars 22 define a rear window opening 24 therebetween, best seen in FIG. 3. A windshield 23 is disposed in an opening formed between the two front roof support pillars 20. The passenger compartment 16 is also defined by at least a pair of doors 26 on opposing sides of the vehicle body 12, each of which include a window opening 28 formed therein. A door glass 30 is retractably disposed in each of the window openings 28, best seen in FIGS. 1 and 2.

A rear window 32 is fixed in a frame 34. Preferably, the frame 34 is a metallic window frame or the like. The frame 34 is hingedly connected to the first body portion 14 at a hinge 35 adjacent a junction of the rear roof support pillars 22 and the first body portion 14. The frame 34 closes the rear window opening 24 when the frame 34 is in a closed position, best seen in FIG. 1. A roof panel 36 is attached to the frame 34 at a hinge 38. The roof panel 36 is preferably formed of a rigid material such as, but not limited to, steel, aluminum, resin impregnated glass fibers known in the art as sheet molding compound (SMC) or a similar rigid material. Preferably, an outer surface of the roof panel 36 is coated with a flexible anti-chip paint coating or the like. Alternatively, at least a portion of the roof panel 36 is transparent to provide an open feeling to the passenger compartment 16 even with the roof panel 36 in the closed position. The roof panel 36, the frame 34, and the rear window 32, when attached via the hinge 38, form a roof assembly, indicated generally at 40. The hinge 38 that attaches the roof panel 36 and the frame 34 is releasably attached to the first body portion 14 at at least one rear roof attachment point 42. The roof panel 36 closes the panel opening 19 when the roof panel 36 is in a closed position, best seen in FIG. 1. A forward edge of the roof panel 36 is releasably attached to the roof 18 at at least one front roof attachment point 44. The roof panel 36 is releasably attached at the attachment points 42 and 44 by any number of commercially available releasable attachment mechanisms generally known to those skilled in the art. Alternatively, the roof assembly 40 is draped across the rear roof attachment point 42 and attached only at the at least one front roof attachment point 44.

A second body portion 46 of the vehicle body 12 extends rearwardly adjacent the first body portion 14. The second body portion 46 forms a storage compartment, indicated generally at 48 and best seen in FIG. 3. The storage compartment 48 is external to the passenger compartment 16 and is open to the air adjacent the rear window opening 24. The storage compartment 48 is preferably a pickup truck bed or the like. The storage compartment 48 is defined by a pair of side panels 50, a floor panel 52, and a rear panel 54, best seen in FIG. 3. Preferably, the rear panel 54 is hingedly and/or releasably attached to the second body portion 46 to provide access to the storage compartment 48, in a manner similar to a pickup truck lift gate or the like.

The roof panel 36 and the frame 34 of the roof assembly 40 are movable to a storage position in the storage compartment 48, best seen in FIGS. 2 and 3, which exposes the passenger compartment 16 to outside air through the panel opening 19 and the rear window opening 24 respectively. When moved to the storage position, roof assembly 40 is disconnected from the respective attachment points 42 and 44 and the roof panel 36 and the frame 34 fold inwardly along the hinge 38 and articulates downwardly along the hinge 35 to move to the storage position shown in FIGS. 2 and 3. In the storage position, the frame 34 and the rear window 32 are positioned between the roof panel 36 and a rearward facing wall of the second body portion 46, which protects the glass of the rear window 32. Preferably, the roof assembly 40 engages with a central rubber bumper 37, best seen in FIGS. 3 and 4, on the floor panel 52 adjacent the first portion 14 of the vehicle body 12 when in the storage position to provide additional stability to the roof assembly 40 when the vehicle 10 is in motion. In addition, for those vehicles where the first body portion 14 and the second body portion 46 are attached separately to a vehicle chassis frame 65, best seen in FIG. 4, the bumper 37 can absorb relative movement between the first body portion 14 and the second body portion 46 when the vehicle 10 is in motion. When the roof assembly 40 is in the storage position and the door windows 30 are lowered, so only the windshield 23 remains in place, the passenger compartment 16 advantageously has a fresh air character. When the roof assembly 40 is in the closed position and the windows 30 are closed, the passenger compartment 16 is advantageously no more noisy than a standard cab and just as secure. Preferably although not required, a cab rear roof header 56, best seen in FIG. 3, extends between an upper end of each of the rear roof support pillars 22. With the rear roof header 56 in place, the vehicle body 12 has increased structural integrity and torsional stiffness and provides a smoother ride.

Appropriate seals (not shown) are provided on the outboard edges of the roof panel 36 and the frame 34 for sealing engaging surfaces of the rear roof support pillars 22 and the frame 34, and engaging surfaces of the roof 18 and the roof panel 36 when the roof assembly 40 is in the closed position shown in FIG. 1. Additionally, mating seals (not shown) are disposed at the periphery of the panel opening 19 for engaging with the outer edges of the roof panel 36. Mating seals (not shown) are also disposed on the periphery of the window opening 28 for engaging with the outer edges of the frame 34. The seals can be, but are not limited to, weatherstripping or a similar type of seal or sealing means that prevents the intrusion of air, water, and/or debris along the edges of the roof panel 36 and the frame 34 into the passenger compartment 16. The roof assembly 40 is actuated between the closed position and the storage position by any one of well known operating mechanisms or actuators (not shown) including, but not limited to, a hand operated spring-assisted crank actuator or an automatic electrical-hydraulic actuator or any other operating mechanism that is operable to move the roof assembly 40 between the closed position shown in FIG. 1 to the storage position shown in FIGS. 2 and 3. Preferably, the roof assembly 40 is secured to the roof 18 in the closed position and to the storage compartment 48 in the storage position and engages with the bumper 37 when in the storage position.

Figure 4:
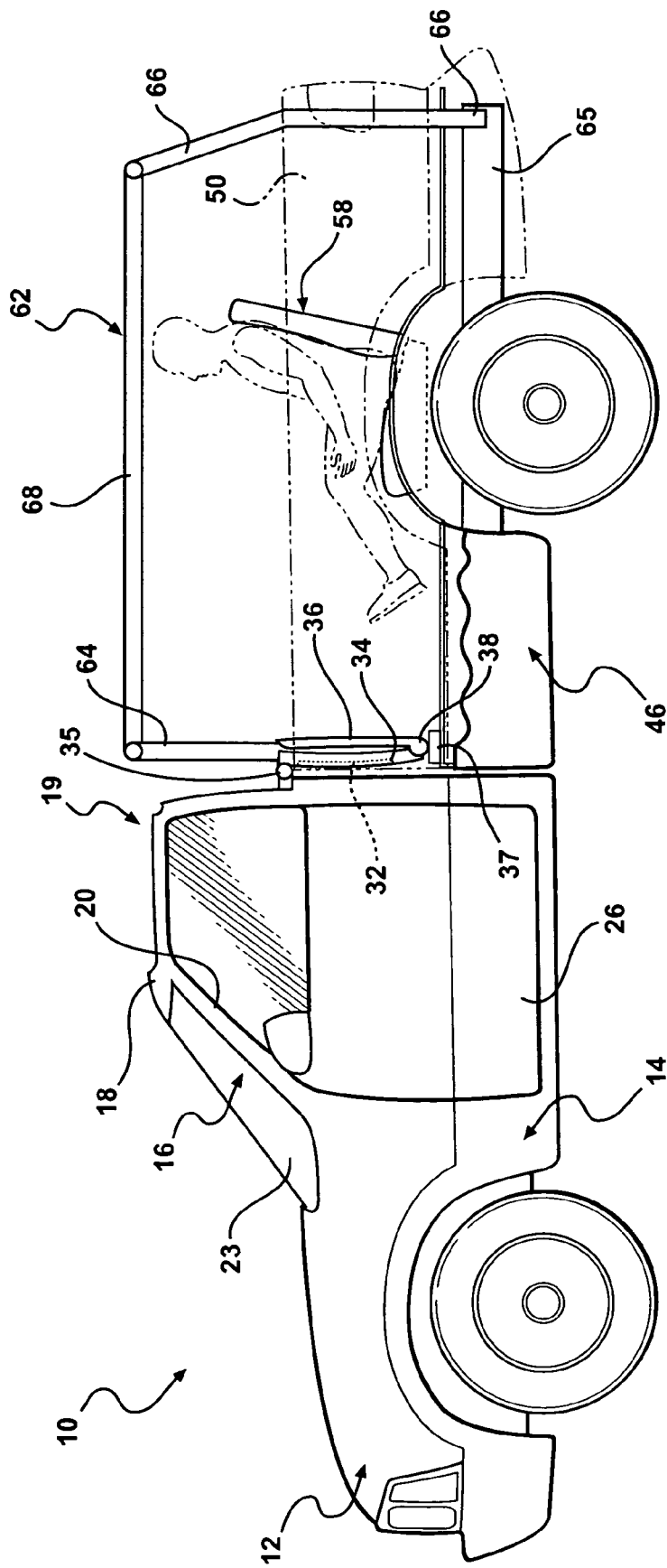
FIG. 4 is a side elevation view of the vehicle of FIG. 2 having a roll bar assembly and a rear seat assembly attached thereto.

Referring now to FIG. 4, alternatively, a rear seat assembly 58 is provided in the storage compartment 48 of the second body portion 46. The rear seat assembly 58 is removably mounted to a wheel well 60 formed adjacent each of the side panels 50 in the storage compartment 48, best seen in FIG. 3. Alternatively, the rear seat assembly 58 is removably mounted to the floor panel 52. If the rear seat assembly 58 is mounted to the wheel wells 60, a space is formed between the floor panel 52 and the lower surface of the seat assembly 58, advantageously leaving the floor panel 52 open for the storage of longer items in the storage compartment 48.

In addition to the rear seat assembly 58, a rear roll bar assembly 62 is attached to and extends upwardly from the second body portion 46. The rear roll bar assembly 62 includes a pair of forward supports 64 and a pair of rear supports 66 connected by a substantially horizontal roll bar 68. Alternatively, the forward supports 64 and the rear supports 66 of the roll bar assembly 62 are formed in a hoop shape or any other shape advantageous for enclosing the second body portion 46 of the vehicle 10. The roll bar assembly 62 may be attached directly to a vehicle chassis frame 65. The roll bar assembly 62 can also carry a roof rack thereon (not shown), if so desired, and could also carry a temporary canvas roof (not shown) if so desired.

In accordance with the provisions of the patent statutes, the present invention has been described in what is considered to represent its preferred embodiment. However, it should be noted that the invention can be practiced otherwise than as specifically illustrated and described without departing from its spirit or scope. For example, while the present invention has been described in the context of pickup trucks, those skilled in the art will realize that the present invention could be utilized with any vehicle type having a body portion open to the air for storing a rigid roof panel.

What is claimed is:

1. A vehicle body, comprising:
   a first body portion forming an enclosed passenger compartment including a roof and a rear window opening, said roof having a panel opening;
   a rear window fixed in a frame, said frame being hingedly attached to said first body portion;
   a rigid roof panel being hingedly attached to said frame, said frame and said panel forming a roof assembly being movable between a storage position and a closed position and closing said panel opening and said rear window opening when in the closed position; and
   a second body portion forming a storage compartment external to said passenger compartment and being open adjacent said rear window opening;
   wherein said roof assembly is movable to the storage position in said storage compartment exposing said passenger compartment to outside air through said panel opening and said rear window opening.

2. The vehicle body according to claim 1 wherein at least one of said frame and said roof panel is formed of steel.

3. The vehicle body according to claim 1 wherein at least one of said frame and said roof panel are formed of SMC.

4. The vehicle body according to claim 1 wherein at least one of said frame and said roof panel are formed of aluminum.

5. The vehicle body according to claim 1 wherein at least a portion of said roof panel is transparent.

6. The vehicle body according to claim 1 wherein said first body portion is a pickup truck cab and said second body portion is a pickup truck bed.

7. The vehicle body according to claim 6 including at least one seat removably attached to said pickup truck bed.

8. The vehicle body according to claim 6 wherein said pickup truck bed includes wheel wells and at least one seat is removably mounted to said wheel wells.

9. The vehicle body according to claim 6 including a roll bar assembly attached to and extending upwardly from said pickup truck bed.

10. The vehicle body according to claim 9 wherein said roll bar assembly is attached to a vehicle chassis frame.

11. The vehicle body according to claim 1 wherein said frame and said rear window are positioned between said roof panel and a wall of said second body portion when in the storage position.

12. The vehicle body according to claim 1 including a cab rear roof header attached to said roof located generally between said panel opening and said rear window opening.

13. The vehicle body according to claim 1 including a central rubber bumper attached to the pickup bed to engage with said roof assembly when said roof assembly in the storage position.

14. A roof assembly for enclosing a passenger compartment of a vehicle body having a first body portion and a second body portion, the first body portion forming an enclosed passenger compartment including a roof and a rear window opening, the roof having a panel opening, said roof assembly comprising:

a rear window fixed in a frame, said frame being hingedly attached to the first body portion to close the rear window opening in a closed position;

a rigid roof panel being hingedly attached to said frame and closing the panel opening in the closed position; and wherein said roof panel and said frame are movable together to a storage position in a storage compartment in the second body portion of the vehicle body, the storage compartment being formed external to the passenger compartment and being open adjacent the rear window opening, said roof panel and said frame exposing said passenger compartment to outside air through said panel opening and said rear window opening respectively when in the storage position.

15. The roof assembly according to claim 14 wherein at least one of said frame and said roof panel are formed of steel.

16. The roof assembly according to claim 14 wherein at least one of said frame and said roof panel are formed of SMC.

17. The roof assembly according to claim 14 wherein at least one of said frame and said roof panel are formed of aluminum.

18. The roof assembly according to claim 14 wherein at least a portion of said roof panel is transparent.

19. The roof assembly according to claim 14 wherein said first body portion is a pickup truck cab and said second body portion is a pickup truck bed.

20. The roof assembly according to claim 14 including a central rubber bumper attached to the pickup truck bed for providing stability to said roof assembly when said roof assembly in the storage position.

* * * * *